United States Patent Office 3,481,701
Patented Dec. 2, 1969

3,481,701
MANUFACTURING PROCESS OF HYDRAZINE HYDRATE
Masatomi Otsuka, Naruto, Seizo Koumura, Tokushima, and Hideo Yamaguchi and Hidetoshi Kume, Naruto, Japan, assignors to Otsuka Kagakuyakuhin Kabushiki Kaisha, also known as Otsuka Chemical Co., Ltd., Osaka City, Osaka Prefecture, Japan
Filed Dec. 5, 1966, Ser. No. 598,996
Claims priority, application Japan, Feb. 10, 1966, 41/7,374
Int. Cl. C01c 1/28
U.S. Cl. 23—190                                 1 Claim

ABSTRACT OF THE DISCLOSURE

Process for producing hydrazine hydrate by the hydrolysis of a ketazine under atmospheric pressure, which process involves heating a ketazine composition containing ketone and hydrazine hydrate in a mol ratio of less than 2.0 and the vapor evolved from this first stage is passed through a first column consisting of multiple stages of a ketazine material in which the ketone to hydrazine hydrate ratio in the liquid becomes larger stage by stage, and whereby the corresponding ketone is produced by means of continual hydrolysis, said ketone being removed by fractional distillation and wherein the hydrazine hydrate is removed from the first stage.

---

This invention relates to a new process of manufacturing hydrazing hydrate.

It is well known that hydrazine hydrate can be made from ketazines under 5–10 atmospheres pressure by means of hydrolysis and that it requires a temperature of 130–180° C. The hitherto known process had the following three defects:

(1) The high temperature causes the hydrazine hydrate to decompose.
(2) It requires a high pressure generating apparatus.
(3) As the hydrolysis of ketazine evolves a great volume of vapor, the thermal efficiency is impaired.

It is an object of the present invention, to correct the above-mentioned defects. According to the present invention, the continuous hydrolysis of ketazine can be effectively performed under normal atmospheric pressure, and the thermal efficiency is greatly improved.

Prior to the detailed description of this invention, reaction equations of hydrolysis are given below. Said equations proceed from $(x)$ and $(y)$ and are completed in $(z)$.

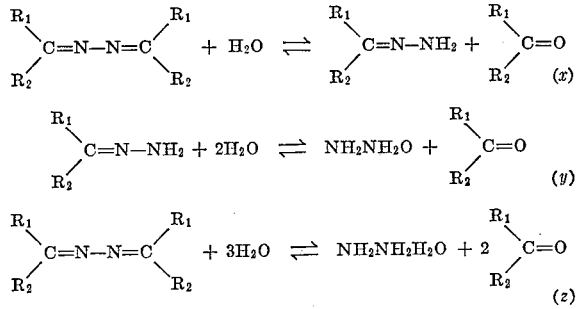

$R_1$ and $R_2$ show alkyl radicals of 1–3 carbon atoms respectively and the total number of the carbon atoms $R_1$ and $R_2$ is 4 or less than 4.

The reaction of hydrolysis being a reversible one, the four ingredients, ketazine, hydrazone, hydrazine hydrate and ketone, can coexist.

Details of this invention are fully stated in the following descriptions and the attached drawing.

Figure 1:
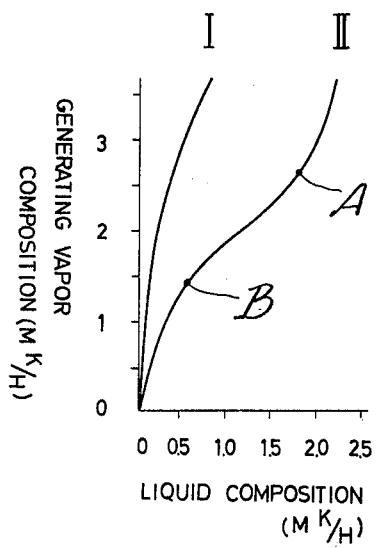
Figure 2:
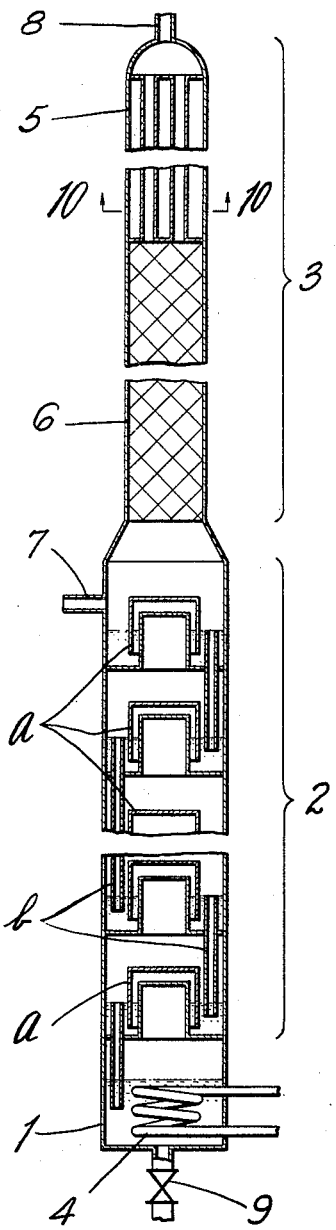
Figure 3:
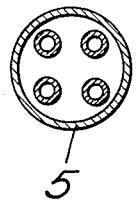

FIG. 1 shows the gas and the liquid relation of ketazine in course of hydrolysis. FIG. 2 shows a vertical section of one of the apparatuses used for executing the manufacturing processes of this invention. FIG. 3 shows a cross section along the line 10—10 of FIG. 2.

First, in order to give a clear description of the invention, composites to be hydrolyzed are given in the form of M K/H (mol ratio) of ketone and of hydrazine hydrate. For example, M K/H=2.0 represents ketazine in course of reaction and M K/H=1.0 hydrazone. Hydrolysis means that the reactions of $(x)$–$(z)$ equations proceed to the right and are expressed in the decline of M K/H. The following applies to a case in which the ketazine is hydrolyzed. Namely, the composition of vapor evolved by the solution of a definite composition is subject to no change under constant pressure. In this connection, FIG. 1 shows the curve of dimethylketazine measured by 15% solution of hydrazine hydrate. In FIG. 1, curve II shows the state under normal atmospheric pressure and curve I under 6 atmospheres of pressure. The feature of the figure is that the curve II has two salient points A and B. Within the zone between A and B, the reverse reaction of hydrolysis reaction equations $(x)$–$(z)$ increases so much that it hinders hydrolysis and consequently makes industrialization of hydrolysis under normal atmospheric pressure very difficult.

On the other hand, under such circumstances as curve I which has no salient points and as in any point of curve II excepting the zone between A and B, hydrolysis readily goes on in the ordinary packed column, and the reaction of equations $(x)$–$(z)$ proceeds to the right. When ketazine is converted into hydrazine hydrate by means of hydrolysis, if expressed in terms of M K/H, M K/H 2.0 is to be reduced as low as 0.2–0.01 from practical point of view, and under the normal atmospheric pressure a great part of hydrolysis is performed in the zone between A and B where it is difficult to hydrolyze.

Now let us give full details of this invention.

It's three advantages are as follows:
(1) Continuous hydrolysis can be carried out under normal atmospheric pressure.
(2) The thermal efficiency of hydrolysis is increased to a marked degree.
(3) The checking of the thermal decomposition of hydrazine hydrate results in an improved ratio of yield.

Details of FIG. 2, apparatuses and operation are given below:

A still 1 is 15 cm. in inner diameter and 15 cm. in height and contains in it a spiral coil 4 for heating. It is capable of containing 1,000 cc. of chemical solutions.

A first column 2 consists of multiple stages, each stage having a bubble cap $a$ and a downtake pipe $b$, and is capable of containing 300 cc. chemical solutions. The first column 2 is the essentials of this invention.

A second column 3 mounted on the first is 10 cm. in inner diameter and 150 cm. in height, and is a reflux condenser 6 with a Raschig-ring in it. This second column 3 is used for fractional distillation of raw material ketazine and ketone component produced by hydrolysis in the first column 2. It completes this invention.

Raw material ketazine of proper concentration is fed from a feed pipe 7 set at the top of the first column 2. It is mainly controlled by the boiling point of ketone at the top 8 of the second column 3, and the still 1 keeps it constant temperature. The solution in the still 1 is to be taken out at an outlet 9 of solution in order that the amount of hydrazine hydrate is taken out to correspond with that of ketone produced by hydrolysis.

For the sake of convenience, the solution taken out from the top 8 of the second column 3 is designated as hydrolyzed solution K and the solution from the still 1 hydrolyzed solution H.

Now, as the variety of raw material ketazine is decided, the concentration of total hydrazine hydrate contained in hydrolyzed solution H is determined by that of raw material ketazine, and the amount of ketone contained in hydrolyzed solution H is controlled by the number of stages of the first column 2. Compositions of solution in the still 1 and in each stage of the first column 2 are normalized stage by stage as given below in first item of Table II. This successive normalization is the most vital point in operation.

The following is a full explanation of the three characteristic points of this invention:

The first feature of this invention is that continuous hydrolysis has been achieved under normal atmospheric pressure.

Concerning hydrolysis under normal atmospheric pressure when salient points exist, the inventors compared the available process invented by them with the control process. Example I means the former, while Experiment I latter as shown below.

EXPERIMENT I

The same still and the same second column with those of Example I were used. A 10-stage fractional distillation apparatus containing a normal Raschig-ring 15 cm. in inner diameter and 15 cm. in height was used as the first column (similar to Example I). Similar to Example I, 35% dimethylketazine solution was used as raw material and was fed from the tenth stage of the first column. The raw material was supplied as uniformly as possible, and its amount was fed in accordance with that of acetone produced by hydrolysis and distilled off at the top of the second column. Heat capacity of the still was 1,754 Kcal./hour and hydrolyzed solution H was set at M K/H 0.03. It was so controlled that the amount of hydrazine hydrate could be taken out in accordance with that of ketone contained in hydrolyzed solution K. The result obtained by a continuous 10 hours' operation is given as the control process in the following Table I.

TABLE I

| Division of Process | Embodiment | Volume of Decomposed Solution K (cc.) | Content of Acetone (w./v. percent) | Weight of Acetone (g.) | Comparison |
|---|---|---|---|---|---|
| Available Process by This Invention | Example I | 9,460 | 79 | 7,470 | 30.6 |
| Control Process | Experiment I | 330 | 74 | 245 | 1 |

As above stated, we obtained a result in our available process 30.6 times as big as that in the control process, and broken down the hitherto established hypothesis that hydrolysis of ketazine was impossible under the normal atmospheric pressure. This brilliant achievement based on two fundamental ideas we assort.

First, the reverse reactions of the equations $(x)-(z)$ were prevented by cutting off any contact between gas phases by means of the chemical solution. Therefore no reverse reaction took place in course of hydrolysis. On the other hand in the usual Raschig-ring packed column (Experiment I) reverse reaction takes place between ketone and hydrazine hydrate, which makes hydrolytic efficiency extremely low as shown in Table I. Moreover, this invention has accomplished a process of continuous production. In case of batch system, the speed of hydrolysis of ketazine grows remarkably low as hydrolysis proceeds. FIG. 1, which shows the relation between the composition of the solution and that of vapor, reveals it clearly. In case of hydrolysis of dimethylketazine under normal atmospheric pressure, the liquid composition M K/H 2.0 (that is a state of ketazine) gives out vapor whose composition is M K/H 3.0, and evaporation at a time yields plenty of ketone, it is perceived. On the contrary, the liquid composition M K/H 0.5 evolves vapor whose composition is M K/H 1.4 and a single evaporation alone never yields any free ketone. In the existing process of obtaining free ketone from vapor, a Raschig-ring packed column was used and a small amount of free ketone was secured through repeated operation. This invention is quite different from it. In our new process, vapor below the upper salient point A is continuously blown into a chemical solution whose M K/H value is higher than that of the solution which evolved vapor. Solution compositions in each stage of the column gain equilibrium. Heat generates, which is put into use effectively as thermal source.

The second feature of this invention is an unusual increase of thermal efficiency of hydrolysis. Suppose 35% dimethylketazine is used as raw material and is hydrolyzed to the extent of M K/H 0.03. Example I shows it and Experiment II means the compressed packed column system.

EXPERIMENT II

Heat an apparatus consisting of a 2,000 cc. stainless steel autoclave and of a compressed fractional distillation column, and keep it warm. Place 1,100 cc. of 35% solution of dimethylketazine (M K/H 2.0) and convert it into M K/H 0.03 under 6 atmospheric pressure, supplying suitable amount of energy, measuring the amount of energy, to be supplied to the autoclave, and controlling the temperature at the top of the compressed fractional distillation column. Take out acetone and let raw material ketazine and water flow back. On the other hand, calculate the radiant heat and deduct it from the supplied energy. That is the amount of energy used. The operation takes 60 minutes. Acetone produced weighs 395 g. and the energy spent is 1,736 Kcal.

In the case of this invention, as shown in Example I, 1,754 Kcal./hour is supplied to the still, and 0.747 Kg./hour of acetone is obtained. Thus 1 Kg. of acetone requires 2,348 Kcal. As shown in Experiment II, 1 Kg. of acetone needed 4,403 Kcal. by the existing compressed fractional distillation system. The minimum amount of energy for hydrolysis, that is, the amount of energy calculated from the theoretical point of view is equal to the amount of energy used for converting ketazine into acetone and hydrazine hydrate and for picking up acetone produced in gas form. Therefore, it is energy of material conversion plus latent evaporation heat of acetone. The rate of thermal efficiency, therefore, can be gained by the theoretical amount of heat divided by the used amount of heat:

(1) Example I:

$$\frac{317 \times 100}{2348} = 13.5\%$$

(2) Experiment II:

$$\frac{317 \times 100}{4403} = 7.2\%$$

As above-mentioned, Example I obtained efficiency approximately two times as big as Experiment II. It is needless to say that the first feature of this invention led to this superior result. Moreover in Example I the excess energy of vapor evolved was properly utilized for evolving vapor in case of hydrolysis in the next upper stage, while in case of the existing system excess energy is spent uselessly, as it cools down and so on.

The third feature of this invention is that thermal decomposition of hydrazine hydrate is extremely reduced and consequently the cost of the product was remarkably cut down. Namely, a mixed equal mol solution of dimethylketazine and hydrazine hydrate M K/H 1.0 (500 cc. of solution of 30% concentration in terms of hydrazine hydrate) was made to flow back at a constant speed, and was heated for 10 hours under the condition given below. After being cooled down, hydrazine hydrate was analyzed.

The results were as follows:

(1) Under normal atmospheric pressure: thermal decomposition rate 0.2%, (2) Under 6 atmospheric pressure; thermal decomposition rate 7.5%.

The thermal decomposition rate under normal atmospheric pressure of this invention was as small as 1/37 in comparison with that under the existing well-established 6 atmospheric pressure.

As shown clearly in the above descriptions, in case hydrazine hydrate is made from ketazine as the raw material by means of hydrolysis, vapor evolved from the range of the liquid composition whose mol ratio is less than 2.0 under the normal atmospheric pressure is continuously blown into another liquid composition with a bigger mol ratio stage by stage, whereby hydrazine hydrate and ketone corresponding to raw material ketazine are produced by means of a continuous hydrolysis. Therefore, any variety of ketazine or the number of stages of the first column does not restrict this invention. The required number of stages of the first column is only subject both to the variety of ketazine to the composition of hydrolyzed solution H. 5 or more than 5 stages are usually adaquate, it is considered. The hydrolyzed solution H, after hydrolysis, is usually M K/H 0.02–0.2, and contains 15–40% hydrazine hydrate. The rate of hydrolysis of this invention is generally 90–99%, and the rate of collection of hydrazine hydrate is normally 99.7–99.9%. They are calculated by the following equations:

$$\text{Rate of Hydrolysis} = \frac{\text{Free hydrazine hydrate (g.) contained in hydrolyzed solution H}}{\text{Total hydrazine hydrate (g.) contained in ketazine supplied}} \times 100$$

$$\text{Collection Rate of Hydrazine Hydrate} = \frac{\text{Total hydrazine hydrate (g.) contained in hydrolyzed solution H} + \text{Total hydrazine hydrate (g.) contained in hydrolyzed solution K}}{\text{Total hydrazine hydrate (g.) contained in ketazine supplied}} \times 100$$

Examples are given below.

EXAMPLE I

This example describes the process of producing hydrazine hydrate by means of hydrolysis of dimethylketazine under the normal atmospheric pressure, using the apparatus shown in FIG. 2. Place 1,000 cc. of solution in the still 1 and 300 cc. in each stage of the first column 2. Uniformalize the solution composition in the form shown in Item I of Table II. Supply heat at the rate of 1,754 Kcal./hour from the still 1, control the temperature of the top 8 of the second column 3 at 60° C., supply 35% dimethylketazine from the 10th stage of the first column 2, control said amount to be supplied by measuring the amount of hydrolyzed solution K, and let hydrolyzed solution K run out from the bottom of the still and analyze. After 10 hours of continuous operation, it was confirmed that the stationary states were all right. The results are as follows:

Amount of solution hydrolyzed (in terms of 100% hydrazine hydrate) _____g__ 3,220
Rate of hydrolysis _____percent__ 98
Collection rate of hydrazine hydrate ____do____ 99.8

The fractional concentration apparatus converted the decomposed solution H into 80% hydrazine hydrate containing less than 0.1% ketone.

EXAMPLE II

The apparatus similar to that of Example I was used. The process of producing hydrazine hydrate by hydrolyzing methylethylketazine is as follows: Place 1,000 cc. of the solution in the still 1 and 300 cc. of the solution in each stage of the first column 2. Uniformalize the solution composition in the form given in Item II of Table II. Supply energy of 1,500 Kcal./hour from the still 1, control the temperature of the top 8 of the second column 3 at 95° C., supply 45% methylethylketazine from the top of the first column 2, control said amount to be supplied by measuring the amount of hydrolyzed solution K, and let hydrolyzed solution H take out from the bottom of the still and analyze. After 5 hours' continuous operation, it was confirmed that the stationary states have been reached. The results are given as follows:

Amount of solution hydrolyzed (in terms of 100% hydrazine hydrate) _____g__ 1,710
Rate of hydrolysis _____percent__ 97
Collection rate of hydrazine hydrate _____do____ 99.7

80% hydrazine hydrate was obtained similar to Example I.

TABLE II

| Part of Apparatus | Item I | | Item II | |
|---|---|---|---|---|
| | M K/H | Hydrazine Hydrate (w./v. percent) | M K/H | Hydrazine Hydrate (w./v. percent) |
| Still | 0.02 | 25 | 0.03 | 28 |
| 1st Column: | | | | |
| 1st Stage | 0.08 | 10 | 0.07 | 15 |
| 2d Stage | 0.10 | 7 | 0.10 | 10 |
| 3d Stage | 0.15 | 5 | 0.14 | 10 |
| 4th Stage | 0.25 | 4 | 0.20 | 10 |
| 5th Stage | 0.45 | 4 | 0.35 | 11 |
| 6th Stage | 0.65 | 5 | 0.50 | 12 |
| 7th Stage | 0.90 | 7 | 0.75 | 13 |
| 8th Stage | 1.20 | 10 | 1.15 | 15 |
| 9th Stage | 1.50 | 13 | 1.45 | 17 |
| 10th Stage | 1.85 | 18 | 1.80 | 17 |

What we claim is:

1. A process for producing hydrazine hydrate through hydrolysis of a ketazine as the raw material under normal atmospheric pressure, characterized in that the liquid ketazine composition, containing ketone and hydrazine hydrate in an initial stage in a mol ratio of less than 2.0, is heated and the vapor evolved from this initial stage is passed through a first column consisting of multiple stages of a liquid containing a ketazine raw material in which the ketone to hydrazine hydrate ratio in the liquid becomes larger stage by stage, so that the upper stage in the first column has the highest ratio and whereby ketone corresponding to the raw material ketazine and hydrazine hydrate is produced by means of continued hydrolysis, the ketone being removed by fractional distillation in a reflux condenser mounted above the first column and the liquid hydrazine hydrate being removed from the initial state.

References Cited

UNITED STATES PATENTS 3,010,790  11/1961  Rahlfs et al. _____ 23—190

OSCAR R. VERTIZ, Primary Examiner

H. S. MILLER, Assistant Examiner

U.S. Cl. X.R.

23—283; 260—586